US010080003B2

United States Patent
Tone et al.

(10) Patent No.: US 10,080,003 B2
(45) Date of Patent: Sep. 18, 2018

(54) PROJECTOR AND METHOD FOR CONTROLLING THE SAME

(71) Applicant: SEIKO EPSON CORPORATION, Tokyo (JP)

(72) Inventors: Takehiko Tone, Matsumoto (JP); Sachio Tsuboi, Matsumoto (JP); Minoru Yokobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/572,045

(22) Filed: Dec. 16, 2014

(65) Prior Publication Data

US 2015/0215592 A1    Jul. 30, 2015

(30) Foreign Application Priority Data

Jan. 24, 2014 (JP) .................................. 2014-011066
May 19, 2014 (JP) .................................. 2014-103137

(51) Int. Cl.
*G03B 21/14* (2006.01)
*H04N 9/31* (2006.01)

(52) U.S. Cl.
CPC ......... *H04N 9/3155* (2013.01); *H04N 9/3161* (2013.01); *H04N 9/3182* (2013.01); *H04N 9/3194* (2013.01)

(58) Field of Classification Search
CPC .... G03B 21/14; H09N 9/3155; H04N 9/3161; G02B 27/2214
USPC .......................................... 353/50–59, 7, 85
See application file for complete search history.

(56) References Cited

U.S. PATENT DOCUMENTS

| 7,441,903 | B2* | 10/2008 | Kim ..................... H04N 9/3144 348/748 |
| 8,777,423 | B2* | 7/2014 | Okada .................... G03B 21/20 353/85 |
| 9,310,620 | B2* | 4/2016 | Li ........................... G02B 27/30 |
| 2002/0118341 | A1* | 8/2002 | Asakawa ................. H04N 5/74 353/31 |
| 2007/0195208 | A1 | 8/2007 | Miyazawa et al. |
| 2009/0015799 | A1* | 1/2009 | Luciano ................. G03B 21/10 353/79 |
| 2009/0174866 | A1 | 7/2009 | Okada |

(Continued)

FOREIGN PATENT DOCUMENTS

JP    H02-232739 A    9/1990
JP    A-2006-243324    9/2006

(Continued)

OTHER PUBLICATIONS http://dictionary.cambridge.org/us/dictionary/english/process.*
http://dictionary.cambridge.org/us/dictionary/english/processor.*
Jun. 15, 2018 Office Action issued in U.S. Appl. No. 15/972,595.

*Primary Examiner* — Steven H Whitesell Gordon
*Assistant Examiner* — Jerry Brooks
(74) *Attorney, Agent, or Firm* — Oliff PLC (57) ABSTRACT

A projector includes: a first processor that controls the projector; a second processor that controls the light source; and a storage unit that stores parameters for the second processor to control the light source. The second processor starts to control the light source based on the parameters stored in the storage unit when activated. When the parameters are changed, the first processor stores the changed parameters in the storage unit.

7 Claims, 4 Drawing Sheets

(56) References Cited

U.S. PATENT DOCUMENTS

| | | | |
|---|---|---|---|
| 2009/0219493 A1* | 9/2009 | Okubo | H04N 9/3129 353/85 |
| 2010/0165304 A1* | 7/2010 | Ozawa | G03B 21/2053 353/85 |
| 2011/0119677 A1 | 5/2011 | Saito | |
| 2013/0258296 A1 | 10/2013 | Okada | |
| 2013/0258297 A1 | 10/2013 | Okada | |
| 2015/0215592 A1 | 7/2015 | Tone et al. | |

FOREIGN PATENT DOCUMENTS

| | | |
|---|---|---|
| JP | 2009-163095 A | 7/2009 |
| JP | 2010-170120 A | 8/2010 |
| JP | 2010-210967 A | 9/2010 |
| JP | 2011-081287 A | 4/2011 |
| JP | 2015-158659 A | 9/2015 |
| NO | 2010-137262 A1 | 12/2010 |

\* cited by examiner

PROJECTOR AND METHOD FOR CONTROLLING THE SAME

CROSS-REFERENCE TO RELATED APPLICATION

The entire disclosure of Japanese Patent Application No. 2014-011066, filed Jan. 24, 2014 and Japanese Patent Application No. 2014-103137, filed May 19, 2014 are expressly incorporated by reference herein.

BACKGROUND

1. Technical Field

The present invention relates to a projector and a method for controlling the same.

2. Related Art

In the related art, there has been a projector having two processors, which include a processor that controls the whole projector and a processor that performs a process on a video-output system (including control for lighting a light source lamp). In this projector, the video-output system processor receives parameters required for control from the entire control processor. Thus, the video-output system processor is not able to start a process until the entire control processor is activated and sends the parameters to the video-output system processor. Therefore, it has taken time until the light source lamp is lighted after a power source of the projector is turned ON, and a viewer has had to wait to watch a video.

JP-A-2006-243324 discloses an image transmission system which is provided with a "speed priority mode" and an "image-quality priority mode". The "speed priority mode" is to display an image even when the image is still being drawn. The "image-quality priority mode" is to display the image after the whole image is drawn. The technique disclosed in JP-A-2006-243324 changes a display method after the light source lamp is lighted, and fails to shorten the time before the light source lamp is lighted or the video is output.

In recent years, a solid light source such as a laser or LED (Light Emitting Diode) is mounted as a light source of the projector. The conventional discharge light source lamp takes a long time to reach maximum brightness after the lamp is lighted, but the solid light source takes a short time to reach maximum brightness after the light source is lighted. Therefore, especially when the projector is provided with the solid light source, it is desired to shorten the time, after a power source of the projector is turned ON, before the light source is lighted and the video is output in order to take advantage of the merits of the solid light source.

SUMMARY

An advantage of some aspects of the invention is to solve at least a part of the problems described above, and the invention can be implemented as the following forms or application examples.

Application Example 1

A projector according to this application example is a projector, including: a first processor that controls the projector; a second processor that controls a light source; and a storage unit that stores parameters for the second processor to control the light source, wherein the second processor starts to control the light source based on the parameters stored in the storage unit when activated, and when the parameters are changed, the first processor stores the changed parameters in the storage unit.

According to this projector, the first processor controls the projector. The second processor controls the light source. The storage unit stores parameters for the second processor to control the light source. The second processor reads the parameters stored in the storage unit when activated, and starts to control the light source based on the parameters. When the parameters are changed, the first processor stores the changed parameters in the storage unit. Therefore, since the second processor reads the parameters stored in the storage unit and starts to control the light source when activated, it is not necessary to receive the parameters from the first processor, thereby shortening a time before the light source is lighted.

Application Example 2

In the projector according to the application example described above, it is preferable that the second processor activates in accordance with an activation command from the first processor.

Application Example 3

In the projector according to the application example described above, it is preferable that the second processor starts to control the light source without a command from the first processor after activated in accordance with the activation command from the first processor.

According to this projector, the second processor activates in accordance with the activation command from the first processor, but starts to control the light source without the command from the first processor. Thus, it is possible to shorten a time before the light source is lighted. Moreover, the light source controlled by the second processor is controlled under the integrated control of the projector. Therefore, it is possible to prevent the light source from being lighted at an undesired timing or with undesired parameters. Furthermore, the second processor is able to remain in a reset state until the activation command arrives, thus power consumption can be reduced.

Application Example 4

In the projector according to the application example described above, it is preferable that the projector further includes: a menu display unit that displays a menu image for setting the projector; and an operation receiving unit that receives operations performed in the menu image, wherein when the parameters are changed in accordance with the operation received in the menu image by the receiving unit, the first processor stores the changed parameters in the storage unit.

According to this projector, the menu display unit displays the menu image. The operation receiving unit receives the operations performed in the menu image. When the parameters are changed in the menu image, the first processor stores the changed parameters in the storage unit. Therefore, even when the parameters related to the second processor are changed in the menu image, the second processor is able to read the changed parameters from the storage unit and start to control the light source.

Application Example 5

In the projector according to the application example described above, it is preferable that the first processor stores predetermined parameters related to the second processor in the storage unit when the projector is operated to be turned OFF.

According to this projector, when the projector is operated to be turned OFF, the predetermined parameters are stored in the storage unit. The predetermined parameters mean parameters related to the second processor. Therefore, the second processor is able to read the predetermined parameters from the storage unit and start to control the light source.

Application Example 6

In the projector according to the application example described above, it is preferable that the second processor notifies the first processor when the light source is prepared to be lighted, and that the first processor performs a predetermined decision process when receiving the notification and instructs the second processor to light the light source if a result of the predetermined decision process is normal.

According to this projector, the second processor notifies the first processor when the light source is prepared to be lighted. The first processor performs the predetermined decision process when receiving the notification. If the decision result is normal, the first processor instructs the second processor to light the light source. Therefore, the second processor lights the light source when the decision result is normal. Thus, when the projector is abnormal, it is possible to avoid lighting the light source.

Application Example 7

In the projector according to the application example described above, it is preferable that the predetermined decision process performed by the first processor is a decision process for deciding whether a cooling mechanism of the projector functions normally or not.

According to this projector, the predetermined decision process means the decision process for deciding whether the cooling mechanism of the projector functions normally or not. Therefore, when the cooling mechanism is not normal, it is possible to avoid lighting the light source.

Application Example 8

In the projector according to the application example described above, it is preferable that the predetermined decision process performed by the first processor is a decision process for deciding whether a sensor for measuring an illuminance of the light source is normally worked or not.

According to this projector, the predetermined decision process is a decision process for deciding whether a sensor for measuring an illuminance of the light source is normally worked or not. Therefore, when the sensor is not normal, it is possible to avoid lighting the light source.

Application Example 9

A method for controlling a projector according to this application example is a method for controlling a projector which includes: a first processor that controls the projector; a second processor that controls a light source; and a storage unit that stores parameters for the second processor to control the light source, the method including: allowing the second processor to start to control the light source on the basis of the parameters stored in the storage unit when the second processor is activated; and allowing the first processor to store, when the parameters are changed, the changed parameters in the storage unit.

According to this method for controlling the projector, the second processor reads the parameters stored in the storage unit when activated, and starts to control the light source. Therefore, it is not necessary to receive the parameters from the first processor, thereby shortening a time before the light source is lighted.

When the projector and the method for controlling the same as described above are achieved using a computer provided in the projector, the forms or application examples may be configured as a program for realizing the functions, or as a recording medium which records the program in a computer-readable form. As the recording medium, it is possible to use various computer-readable media, such as a flexible disk, HDD (Hard Disk Drive), CD-ROM (Compact Disk Read Only Memory), DVD (Digital Versatile Disk), Blu-ray Disc (registered mark), a magnetic optical disk, a non-volatile memory card, an internal memory of the projector (e.g. a semiconductor memory such as RAM [Random Access Memory] or ROM [Read-only Memory]), or an external memory (e.g. a USB [Universal Serial Bus] memory).

BRIEF DESCRIPTION OF THE DRAWINGS

The invention will be described with reference to the accompanying drawings, wherein like numbers reference like elements.

FIGS. 2A and 2B are drawings illustrating a rotational fluorescent plate according to the embodiment.

DESCRIPTION OF EXEMPLARY EMBODIMENTS

Embodiment

The projector including a laser light source as a solid light source will be described hereinafter as an embodiment.

Figure 1:
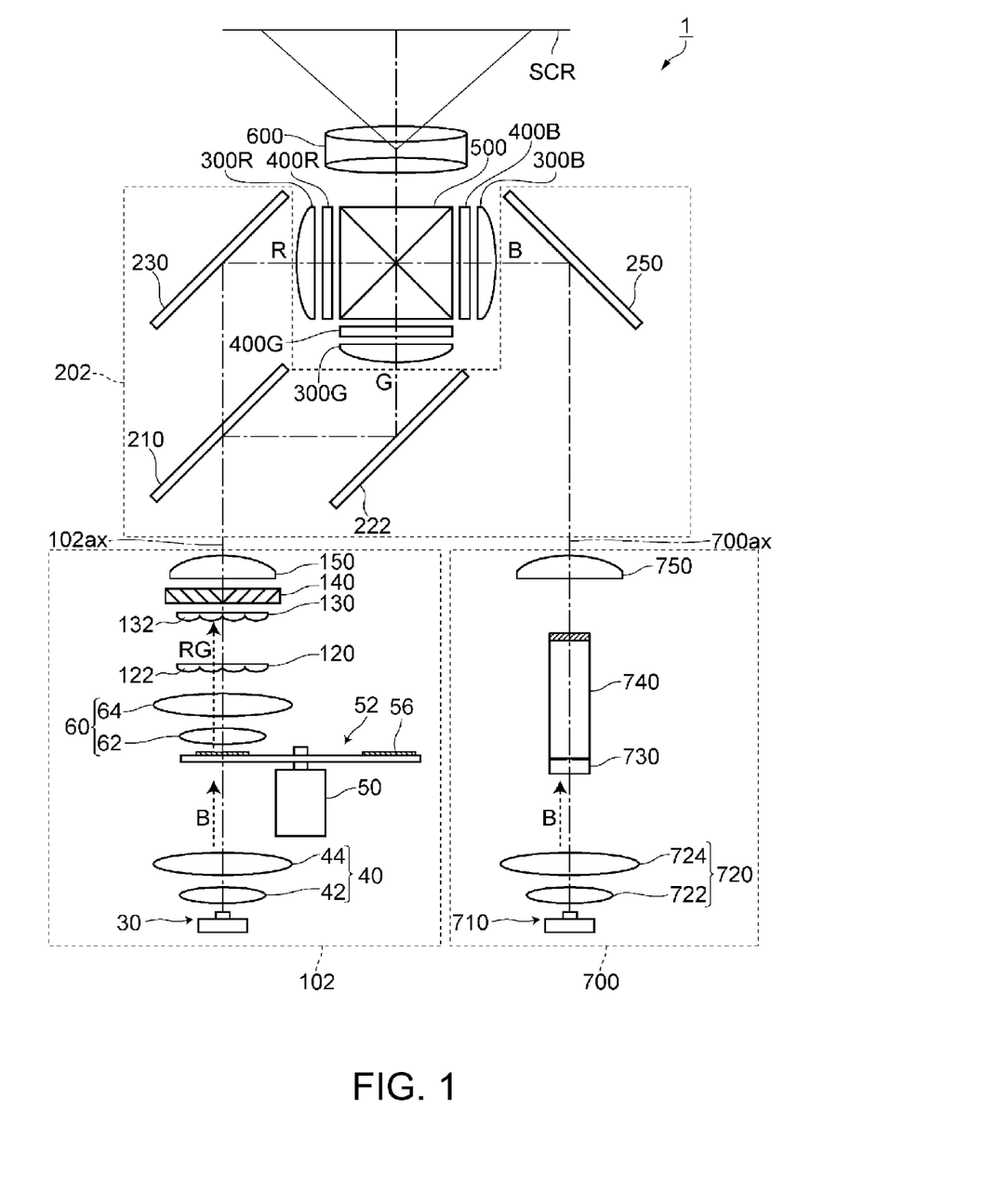
FIG. 1 is a top view of an optical system of the projector according to an embodiment.

FIG. 1 is a top view of the optical system of the projector 1 according to the embodiment. In FIG. 1, a thickness of a component of the rotational fluorescent plate 52 is overdrawn for easy understanding.

Figure 2A:
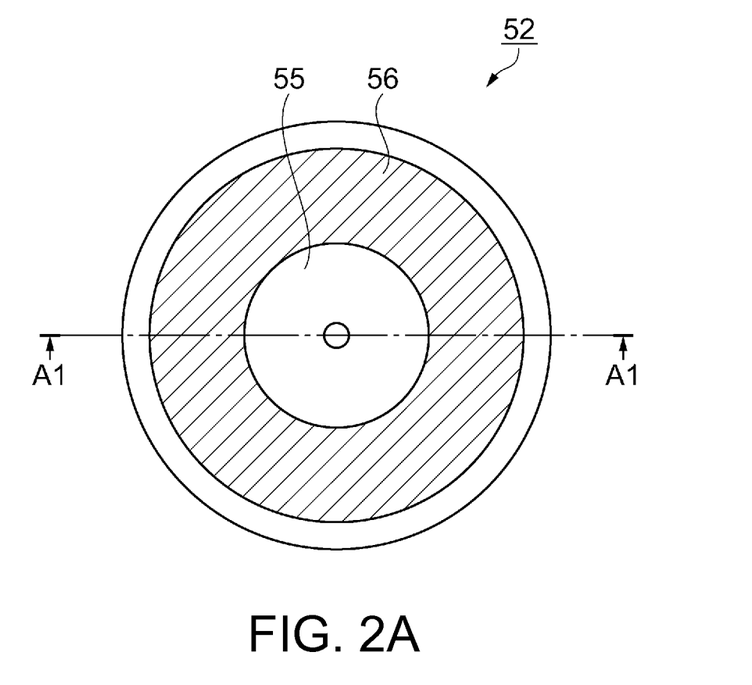
FIG. 2A is a front view of the rotational fluorescent plate.
Figure 2B:
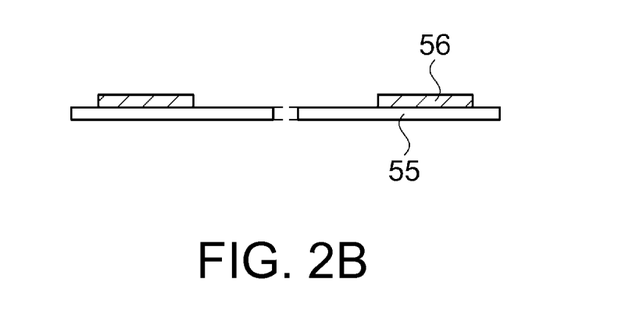
FIG. 2B is a sectional view of the rotational fluorescent plate taken along a line A1-A1 in FIG. 2A.

FIGS. 2A and 2B are drawings illustrating the rotational fluorescent plate 52 according to the embodiment. FIG. 2A is a front view of the rotational fluorescent plate 52, and FIG. 2B is a sectional view of the rotational fluorescent plate 52 taken along a line A1-A1 in FIG. 2A.

A first illuminating device 102 is provided with a first light source device 30, a light collection optical system 40, the rotational fluorescent plate 52, a motor 50, a collimate optical system 60, a first lens array 120, a second lens array 130, a polarization conversion element 140 and a superimposed lens 150.

The first light source device 30 includes a laser light source (solid light source) which emits blue light (peak of light intensity: approximately 445 nm) consisting of later beam as excitation light. The light source device may include a single laser light source or a plurality of the laser light sources. Moreover, the light source device which emits blue light having a wavelength other than 445 nm (e.g. 460 nm) may be employed.

The light collection optical system 40 is provided with a first lens 42 and a second lens 44. The light collection optical system. 40 is arranged in an optical path from the first light source device 30 to the rotational fluorescent plate 52, and allows the substantially-collected blue light to enter a fluorescent layer 56 (to be described below). The first lens 42 and the second lens 44 consist of convex lenses.

The rotational fluorescent plate 52 is a so-called transmissive rotational fluorescent plate. As shown in FIGS. 1 to 2B, the fluorescent layer 56 is continuously formed on a part of a circular plate 55, which is rotatable by the motor 50, along with a circumferential direction of the circular plate 55. A region where the fluorescent layer 56 is formed includes a region which the blue light enters. The rotational fluorescent plate 52 is configured to emit red light and green light toward a side opposite to a blue-light incidence side.

The blue light from the first light source device 30 enters the rotational fluorescent plate 52 from a side of the circular plate 55.

The fluorescent layer 56 converts the blue light from the first light source device 30 into light including the red light and the green light. In particular, the fluorescent layer 56 is effectively excited by the blue light having a wavelength of approximately 445 nm, and converts the blue light emitted from the first light source device 30 into yellow light (fluorescence) including the red light and the green light.

The collimate optical system 60 is provided with a first lens 62 which suppresses the expansion of the light from the rotational fluorescent plate 52, and a second lens 64 which allows the light from the first lens 62 to be approximately parallel, as shown in FIG. 1. That is, the collimate optical system 60 has a function which allows the light from the rotational fluorescent plate 52 to be approximately parallel. The first lens 62 and the second lens 64 consist of convex lenses.

The first lens array 120 has a plurality of first small lenses 122 which are used for splitting the light from the collimate optical system 60 into partial luminous fluxes. The first lens array 120 functions as a luminous flux splitting element for splitting the light from the collimate optical system 60 into partial luminous fluxes, and has a configuration in which the plurality of first small lenses 122 are arranged in a shape of matrix with multi-rows and multi-columns within a plane where the plurality of first small lenses 122 are perpendicular to an illumination axis 102ax. The description accompanying the drawing is omitted, but an outer shape of the first small lens 122 is a shape substantially similar to outer shapes of image forming regions of liquid-crystal light modulation devices 400R, 400G and 400B.

The second lens array 130 has a plurality of second small lenses 132 corresponding to the plurality of first small lenses 122 of the first lens array 120. The second lens array 130 has a function of forming an image of each first small lens 122 of the first lens array 120 in the vicinity of the image forming regions of the liquid-crystal light modulation devices 400R, 400G and 400B, together with the superimposed lens 150.

The second lens array 130 has a configuration in which the plurality of second small lenses 132 are arranged in a shape of matrix with multi-rows and multi-columns within a plane where the plurality of second small lenses 132 are perpendicular to the illumination axis 102ax.

The polarization conversion element 140 is a polarization conversion element which emits each partial luminous flux split by the first lens array 120, as substantially one type of linearly polarized light having an aligned polarization direction.

The polarization conversion element 140 includes: a polarization separation layer in which one of the linearly polarized components included in the light from the rotational fluorescent plate 52 is permeated as it is, and the other of the linearly polarized components is reflected in a direction perpendicular to the illumination axis 102ax; a reflective layer which reflects the other of the linearly polarized components reflected by the polarization separation layer towards a direction parallel to the illumination axis 102ax; and a phase difference plate which converts the other of the linearly polarized components reflected by the reflective layer into the one of the linearly polarized components.

The superimposed lens 150 is an optical element for collecting each of the partial luminous fluxes from the polarization conversion element 140 and for superimposing the collected fluxes in the vicinity of the image forming regions of the liquid-crystal light modulation devices 400R, 400G and 400B. The superimposed lens 150 is arranged such that an optical axis of the superimposed lens 150 coincides with an optical axis of the first illuminating device 102. Moreover, the superimposed lens 150 may be configured as a compound lens combining a plurality of lenses. The first lens array 120, the second lens array 130 and the superimposed lens 150 constitute an integrated optical system which uniforms an in-plane light intensity distribution of the light from the rotational fluorescent plate 52.

A second illuminating device 700 is provided with a second light source device 710, a light collection optical system 720, a scattering plate 730, a polarization conversion integrator rod 740 and a condensing lens 750.

The second light source device 710 is a laser light source which emits blue light (peak of light intensity: approximately 445 nm) consisting of later beam as color light.

The light collection optical system 720 is provided with a first lens 722 and a second lens 724 as shown in FIG. 1. The light collection optical system 720 allows the substantially-collected blue light to enter the scattering plate 730. The first lens 722 and the second lens 724 consist of convex lenses.

The scattering plate 730 scatters the blue light from the second light source device 710 with a predetermined degree of scattering to generate blue light with a light distribution similar to that of the fluorescent light (the red light and the green light emitted from the rotational fluorescent plate 52). As the scattering plate 730, for example, a frosted glass consisting of an optical glass may be employed.

The polarization conversion integrator rod 740 uniforms an in-plane light intensity distribution of the blue light from the second light source device 710, and converts the blue light into substantially one type of linearly polarized light having an aligned polarization direction. Even though the detailed description is omitted, the polarization conversion integrator rod 740 has: an integrator rod; a reflective plate which is arranged on an incidence plane side of the integrator rod and has a small hole that the blue light enters; and a reflective polarization plate which is arranged on an emitting plane side.

The condensing lens 750 collects the light from the polarization conversion integrator rod 740 and allows it to enter in the vicinity of the image forming region of the liquid-crystal light modulation device 400B.

A color separation light guide optical system 202 is provided with a dichroic mirror 210, and reflective mirrors 222, 230 and 250. The color separation light guide optical system 202 separates the light from the first illuminating device 102 into the red light and the green light, and guides each of the color light, i.e. the red light and the green light from the first illuminating device 102 and the blue light from the second illuminating device 700, to the liquid-crystal light modulation devices 400R, 400G and 400B, which are lighting objects, respectively.

The red light passed through the dichroic mirror 210 is reflected by the reflective mirror 230, and enters the image forming region of the liquid-crystal light modulation device 400R for the red light via the condensing lens 300R. The green light reflected by the dichroic mirror 210 is further reflected by the reflective mirror 222, and enters the image forming region of the liquid-crystal light modulation device 400G for the green light via the condensing lens 300G.

The blue light from the second illuminating device 700 is reflected by the reflective mirror 250, and enters the image forming region of the liquid-crystal light modulation device 400B for the blue light via the condensing lens 300B.

The liquid-crystal light modulation devices 400R, 400G and 400B form a color image by modulating incident color light in accordance with image information, which are lighting objects of the illuminating devices 102 and 700. Even though not shown, incidence-side polarization plates are interposed and arranged between each of the condensing lenses 300R, 300G and 300B and each of the liquid-crystal light modulation devices 400R, 400G and 400B, respectively. Moreover, emitting-side polarization plates are interposed and arranged between each of the liquid-crystal light modulation devices 400R, 400G and 400B and a cross dichroic prism 500, respectively. The respective incident color light is subjected to light-modulation by the incidence-side polarization plates, the liquid-crystal light modulation devices 400R, 400G and 400B, and the emitting-side polarization plates.

The liquid-crystal light modulation devices 400R, 400G and 400B are transmissive liquid-crystal light modulation devices which seal and enclose the liquid crystal, an electro-optical material, between a pair of transparent glass substrates. This device modulates, for example, the polarization direction of one type of the linearly polarized light, which enters from the incidence-side polarization plate, in accordance with a given image signal with a poly silicon TFT as a switching element.

The cross dichroic prism 500 is an optical element which synthesizes optical images modulated for each color light emitted from the emitting-side polarization plate to form the color image. This cross dichroic prism 500 has an approximately square shape in a plan view, which is configured by bonding four right-angle prisms. Dielectric multilayer films are formed at the substantially X-shaped interface of the right angle prisms. The dielectric multilayer film formed on one plane of the X-shaped interface reflects the red light, and the dielectric multilayer film formed on the other plane of the X-shaped interface reflects the blue light. The red light and the blue light are bent by these dielectric multilayer films and aligned in a traveling direction of the green light, thereby synthesizing the three colors.

The color image emitted from the cross dichroic prism 500 is expanded and projected by a projection optical system 600. The image is formed on a screen SCR.

Figure 3:
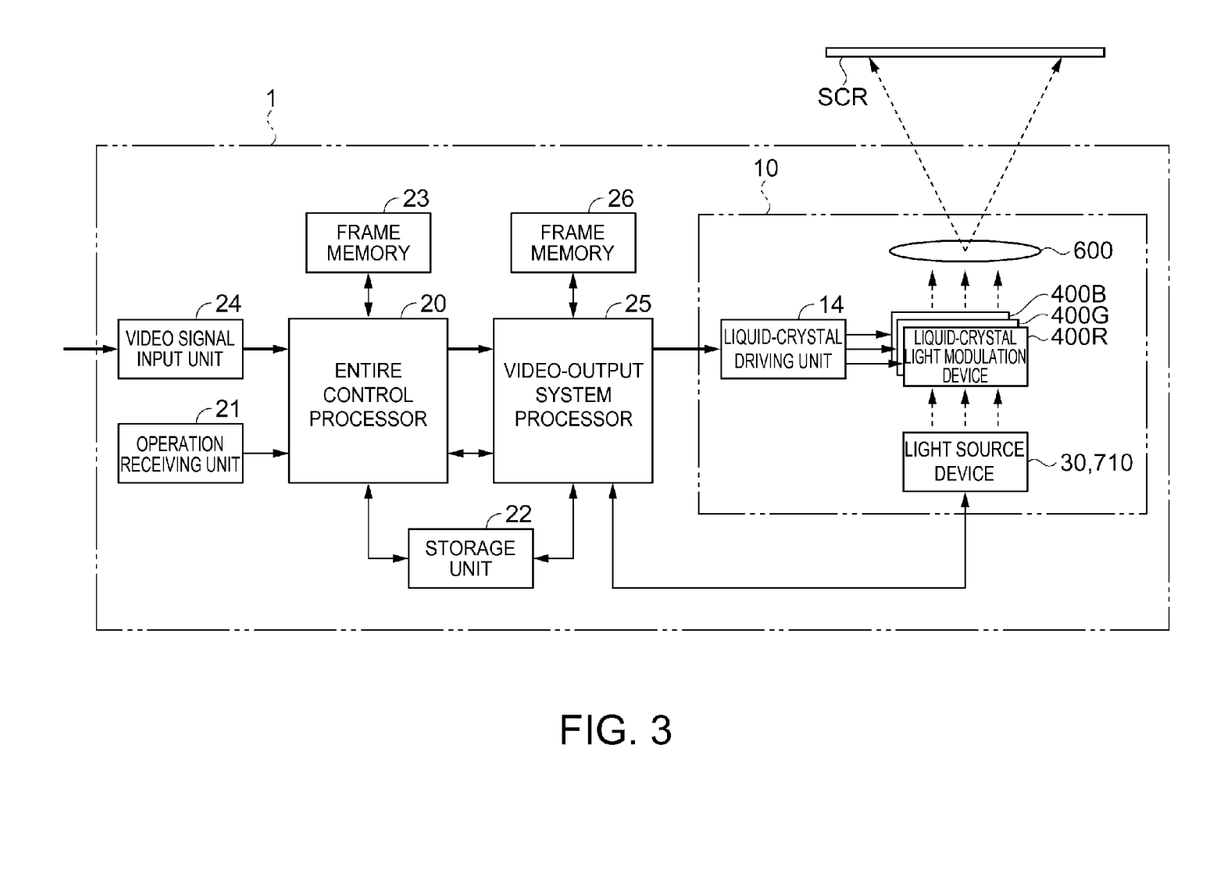
FIG. 3 is a block diagram indicating a skeleton framework of the projector.

FIG. 3 is a block diagram indicating a skeleton framework of the projector 1.

As shown in FIG. 3, the projector 1 is provided with an image projection unit 10, an entire control processor 20 which corresponds to the first processor, an operation receiving unit 21, a storage unit 22, a frame memory 23, a video signal input unit 24, a video-output system processor 25 which corresponds to the second processor, and a frame memory 26.

The image projection unit 10 includes: the light source devices 30 and 710, which correspond to the light source; three liquid-crystal light modulation device 400R, 400G and 400B which correspond to the light modulation device; the projection optical system 600; and a liquid-crystal driving unit 14, etc. The image projection unit 10 modulates the light emitted from the light source devices 30 and 170 to image light by the liquid-crystal light modulation devices 400R, 400G and 400B, and projects the image light by the projection optical system 600 to display the image on the screen SCR.

The blue light consisting of the laser beam emitted from the first light source device 30 causes the red light (R) and the green light (G) to be emitted towards a side opposite to a side which the blue light enters by the rotational fluorescent plate 52. The second light source device 710 emits the blue light (B) consisting of the laser beam. The respective light is converted into the light with an approximately-uniformed luminance distribution by the integrator optical system or the integrator rod, etc. The respective light enters into each of the liquid-crystal light modulation devices 400R, 400G and 400B by the dichroic mirror 210 and the reflective mirrors 222, 230 and 250.

The liquid-crystal light modulation devices 400R, 400G and 400B have rectangular pixel regions in which a plurality of pixels (not shown) are arranged in a shape of matrix. The driving voltage can be applied to the liquid crystal for respective pixels. The liquid-crystal driving unit 14 applies the driving voltage for the respective pixel in response to the input image information, the respective pixel is set to a light transmission rate in accordance with the image information. Therefore, the light emitted from the light source devices 30 and 710 is converted by passing through the pixel regions of the liquid-crystal light modulation devices 400R, 400G and 400B. The image light is formed for each color light in response to the image information. The image light formed for each color is synthesized for the respective pixel by the color synthesizing optical system (the cross dichroic prism 500) to be the colored image light. The colored image light is expanded and projected by the projection optical system 600.

The entire control processor 20 is provided with a CPU (Central Processing Unit), a RAM (Random Access Memory) which is used for temporary storage of various data, etc., a non-volatile ROM (Read-only Memory), etc. The operation of the projector 1 is subjected to the integrated control by operating the CPU in accordance with a control program stored in the ROM. The entire control processor 20 converts a video signal input by the video signal input unit 24 into the image information which represents a gradation of the respective pixel of the liquid-crystal light modulation devices 400R, 400G and 400B, i.e. the image information which defines the driving voltage applied to the respective pixel, to develop the image information in the frame memory 23. The entire control processor 20 performs an image quality adjustment process, etc. on the converted image information in order to adjust image quality such as brightness, contrast, sharpness, shade, etc. The image information subjected to the image quality adjustment process, etc. is output to the video-output system processor 25.

Moreover, the entire control processor 20 controls a fan which corresponds to the cooling mechanism, a motor for an aperture of the lens, and a motor for a lens shutter. Furthermore, the entire control processor 20 detects whether the fan functions normally or not, whether the motor for the aperture functions normally or not, whether the motor for the lens shutter functions normally or not, and whether a sensor for measuring illuminance values of the light source devices 30 and 710 functions normally or not.

The entire control processor 20 performs a process to superimpose an OSD (On-screen Display) image, e.g. a menu image or a message image, on the image information. The entire control processor 20 corresponds to the menu display unit when the menu image is displayed.

The operation receiving unit 21 is an operation panel, etc. which receives key operations from the user, and is provided with a plurality of operation keys which allow the user to perform various operations to the projector 1. The operation keys provided in the operation receiving unit 21 of the embodiment include a power source key which switches the ON/OFF of the power source, an input switching key which switches the input image information, a menu key which displays the menu image for various settings, a direction key which is used for selecting an item within the menu image, a decision key which confirms the selected item, etc.

When the user operates various operations keys of the operation receiving unit 21, the operation receiving unit receives this operation and outputs a control signal corresponding to the operation key operated by the user to the entire control processor 20. When the control signal is sent from the operation receiving unit 21, the entire control processor 20 performs a process based on the input control signal to control the operation of the projector 1. Moreover, a remotely-operable remote control (not shown) may be used as an operation input unit instead of the operation receiving unit 21, or together with the operation receiving unit 21. In this case, the remote control sends an operation signal such as an infrared signal in response to the user's operation, and a remote-control signal receiving unit (not shown) receives the operation signal to transmit it to the entire control processor 20.

The storage unit 22 is configured to include a non-volatile memory. The storage unit 22 stores various setting values set by the menu image and the parameters for controlling the video-output and the light source devices 30 and 710. The storage unit 22 is configured to be readable/writable by either of the entire control processor 20 and the video-output system processor 25. The various setting values and the parameters which are set by the menu images are stored in the storage unit 22 by the entire control processor 20.

The parameters stored in the storage unit 22 include ON/OFF setting information of initial image display (also known as "logo image display") when the projector 1 is activated, information on installment state of the projector 1 (rear projection, horizontal inversion, vertical inversion, etc.), information on trapezoidal distortion correction value, information on lighting numbers of the laser light source, a light source type for the driving target, current value information when the light source devices is lighted, a light source adjustment value for adjusting the output balance of the light source devices 30 an 710, an image quality adjustment value, correction value information for pixel deviation, correction value information for color unevenness, etc. The correction value information for pixel deviation is used for correcting alignment errors which occur when the liquid-crystal light modulation devices 400R, 400G and 400B are assembled. The correction value information for color unevenness is used for correcting color unevenness which occurs in a projection region due to individual differences between the liquid-crystal light modulation devices 400R, 400G and 400B.

Among these parameters, the ON/OFF setting information of initial image display when activated, the information on installment state, the information on trapezoidal distortion correction value, the information on lighting numbers of the laser light source, the information on light source type for the driving target, the current value information when the light source device is lighted, the light source balance adjustment value, the correction value information for pixel deviation and the correction value information for color unevenness are used in the video-output system processor 25 when the power source is turned ON. Moreover, the storage unit 22 stores the image information (image data) of the initial image displayed when the projector 1 is activated.

The storage unit 22 stores a part of the parameters as the predetermined parameters when the power source of the projector 1 is turned OFF. In particular, the storage unit 22 stores a light source balance adjustment value, that is, for balancing the output of the first light source device 30 which generates the red light and green light and the output of the second light source device 710 which generates the blue light. When the power source of the projector 1 is turned OFF, the entire control processor 20 detects a balance between the outputs of the light sources, calculates the adjustment value and stores the value in the storage unit 22. The predetermined parameter stored in the storage unit 22 when the power source of the projector 1 is turned OFF is not limited to the light source balance adjustment value. The other parameters may also be stored.

The frame memory 23 is a memory for storing the image information per one screen. The entire control processor 20 develops the input image information in the frame memory 23 to perform the image quality adjustment process, etc.

The video signal input unit 24 is provided with a plurality of input terminals. The image signals in various formats are input to these input terminals from an external image supply device (not shown) such as a video player, a personal computer, etc. The video signal input unit 24 converts the input image signal into digital image information and outputs such image information to the entire control processor 20.

The video-output system processor 25 is provided with a CPU, a RAM which is used for temporary storage of various data, etc., a non-volatile ROM, etc., and controls the video output and the light source devices 30 and 710 by operating the CPU in accordance with the program stored in the ROM. The video-output system processor 25 develops the image information input from the entire control processor 20 in the frame memory 26. The video-output system processor 25 performs a scaling process, a trapezoidal distortion correction process, and a color correction process, etc. on the image information. Moreover, the video-output system processor 25 controls the light source devices 30 and 710, and the liquid-crystal light modulation devices 400R, 400G and 400B.

When the liquid-crystal driving unit 14 drives the liquid-crystal light modulation devices 400R, 400G and 400B in accordance with the image information input from the video-output system processor 25, the light emitted from the light source devices 30 and 710 is converted into the image light in response to the image information by the liquid-crystal light modulation devices 400R, 400G and 400B. The image light is projected by the projection optical system 600.

The activation process performed when the power source of the projector 1 is turned ON will be described.

Figure 4:
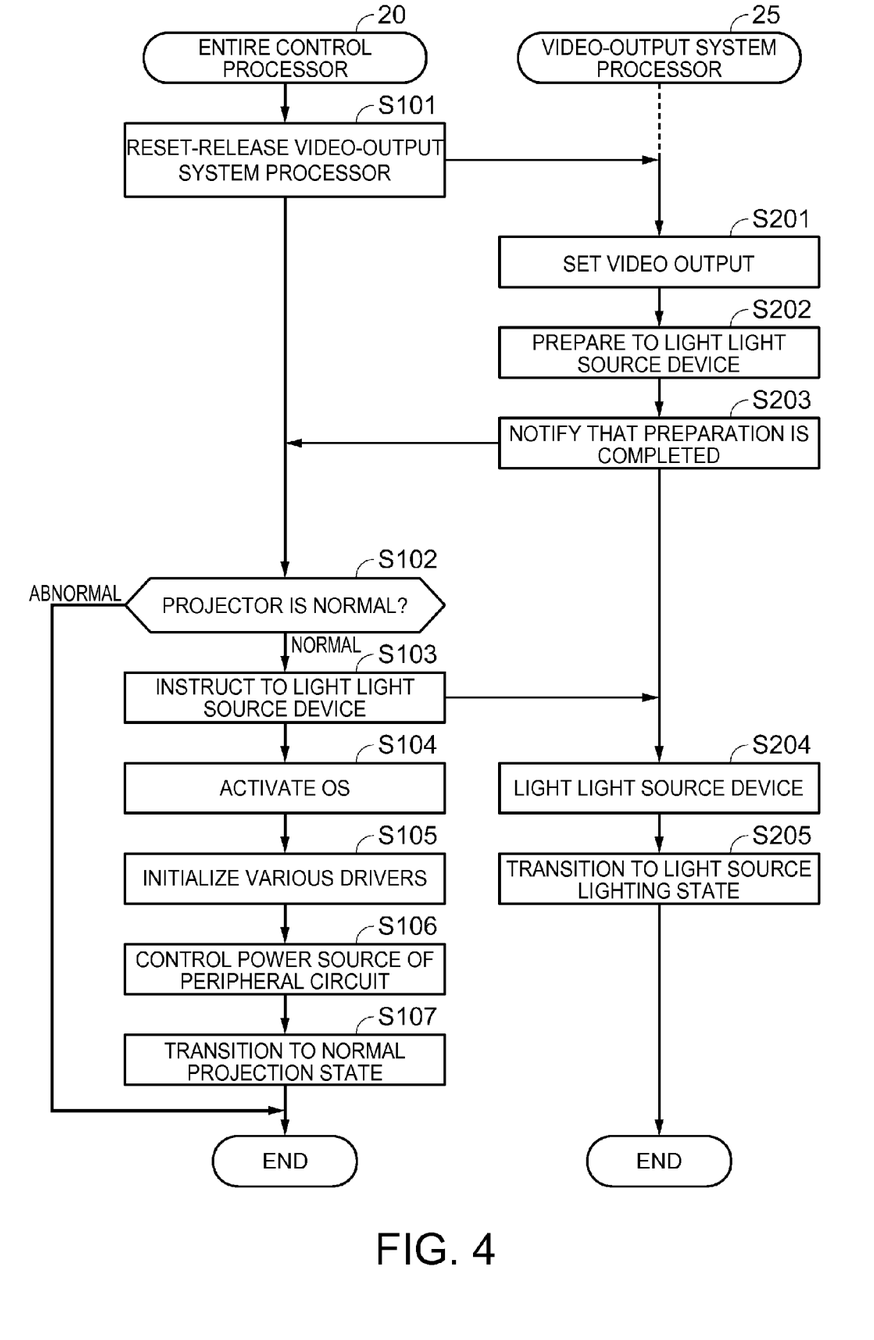
FIG. 4 is a flow chart of an activation process of the projector.

FIG. 4 is a flow chart of an activation process of the projector 1 according to the embodiment.

When the power source is turned OFF, the power source key included in the operation receiving unit 21 is pushed down to cause the power source to be turned ON, the entire control processor 20 is activated to reset-release the video-output system processor 25 (step S101). The video-output system processor 25 is activated when reset-released, and sets the video output based on the parameters stored in the storage unit 22 (step S201). In particular, when the initial image is displayed, the initial image data (logo image data) is written in the frame memory 26. The initial image data is converted based on the information on installment state, the information on trapezoidal distortion correction value, the correction value information for pixel deviation and the correction value information for color unevenness, etc., which are stored in the storage unit 22.

The video-output system processor 25 prepares to light the light source devices 30 and 710 (step S202). In particular, the video-output system processor 25 prepares to light the light source devices 30 and 710 based on the light source type for the driving target, the information on lighting numbers of the laser light source, the current value when the light source is lighted and the light source balance adjustment value, which are stored in the storage unit 22. When the light source devices are prepared to be lighted, the video-output system processor 25 notifies the entire control processor 20 that the preparation is completed (step S203).

The entire control processor 20 performs the predetermined decision when receiving the notification of the completed preparation to determine whether the projector 1 is normal or abnormal (step S102). The predetermined decision includes detections of whether or not the fan functions normally, whether or not the motor for the aperture functions normally and the aperture is fully opened, whether or not the motor for the lens shutter functions normally and the lens shutter is fully opened, and whether or not the sensor for measuring illuminance values of the light source devices 30 and 710 is correctly worked, and a decision of whether or not everything is normal.

When the predetermined decision has at least one result showing an abnormal state (step S102: abnormal), the entire control processor 20 does not instruct to light the light source devices 30 and 710 and finishes the activation process. When the predetermined decision has a result showing that everything is normal (step S102: normal), the entire control processor 20 instructs the video-output system processor 25 to light the light source devices (step S103).

The video-output system processor 25 lights the light source devices 30 and 710 and starts to project the initial image when receiving the instruction to light the light source devices (step S204). The video-output system processor 25 transitions to a light source lighting state (step S205). The light source lighting state means a state where the light source devices 30 and 710 are lighted. Finally, the video-output system processor 25 finishes the activation process.

The entire control processor 20 activates an OS (Operating System) after instructing to light the light source devices (step S104). The entire control processor 20 initializes various drivers (step S105). The entire control processor 20 controls a power source of a peripheral circuit (step S106). The entire control processor 20 transitions to a normal projection state (step S107). The normal projection state means a state where the image is projected based on the image signal. Finally, the entire control processor 20 finishes the activation process.

The embodiment stated above has the following advantages.

(1) The entire control processor 20 of the projector 1 controls the whole projector 1. The video-output system processor 25 controls the video output and the light source devices 30 and 710. The storage unit 22 stores the parameters used when the video-output system processor 25 controls the video output and the light source devices 30 and 710. The video-output system processor 25 controls the video output and the light source devices 30 and 710 based on the parameters stored in the storage unit 22. Since the video-output system processor 25 reads the parameters stored in the storage unit 22 and controls the video output and the light source devices 30 and 710 when reset-released and activated, it is not necessary to receive the information on the parameters from the entire control processor 20. Thus, the video-output system processor 25 can be activated to set the video output and to prepare to light the light source devices 30 and 710, even when the entire control processor 20 still performs the activation process.

Moreover, the video-output system processor 25 notifies the entire control processor 20 that the preparation is completed. The video-output system processor 25 is able to project the initial image by lighting the light source devices 30 and 710 immediately after receiving the instruction to light the light sources from the entire control processor 20. Therefore, the video-output system processor 25 is able to light the light source devices 30 and 710 even when the entire control processor 20 still performs the activation process (OS activation, initialization of various drivers, or control of the peripheral circuit). Thus it is possible to shorten a time from when the power source of the projector 1 is turned ON to when the light source is lighted. The viewer is able to watch the video early after the power source of the projector 1 is turned ON. Especially, it is useful to the projector having the solid light source such as the laser light source, which takes a short time from lighting to reach to the maximum brightness.

(2) According to this projector 1, when the parameters are changed, the entire control processor 20 stores the changed parameters in the storage unit 22. Therefore, the video-output system processor 25 is able to refer to the changed parameters. Since the entire control processor 20 does not need to communicate with the video-output system processor 25 to give information on a change in parameters, it is possible to simplify and speed up the program process.

(3) According to this projector 1, the video-output system processor 25 activates in accordance with the activation command, i.e. reset-release from the entire control processor 20. Therefore, the video-output system processor 25 is able to remain in a reset state until the activation command arrives, thus power consumption can be reduced.

(4) According to this projector 1, when the parameters are changed in the menu image, the entire control processor 20 stores the changed parameters in the storage unit 22. Therefore, even if the parameters related to the video-output system processor 25 are changed by the menu image, the video-output system processor 25 is able to read the parameters from the storage unit 22 when activated, and start to control the video output and the light source devices 30 and 710.

(5) According to this projector 1, when the power source is turned OFF, the storage unit 22 stores the value for balancing the light sources. Therefore, the video-output system processor 25 is able to read the value for balancing the light sources from the storage unit 22 when activated, and to start to control the video output and the light source devices 30 and 710.

(6) According to this projector 1, the video-output system processor 25 notifies the entire control processor 20 after the light source devices 30 and 710 are prepared to be lighted. After receiving the notification, the entire control processor 20 detects whether or not the fan that is the cooling mechanism functions normally, whether or not the motor for the aperture functions normally and the aperture is fully opened, whether or not the motor for the lens shutter functions normally and the lens shutter is fully opened, and whether or not the sensor for measuring illuminance values of the light source devices 30 and 710 is correctly worked, and determines whether or not everything is normal. When the predetermined decision has a result showing that everything is normal, the entire control processor 20 instructs the video-output system processor 25 to light the light source. Therefore, the video-output system processor 25 lights the light source devices 30 and 710 when the predetermined decision has a result showing that everything is normal. Thus the light sources advantageously avoid being lighted when the projector 1 has even one malfunction.

The invention is not limited to the embodiment stated above, but may be achieved by various modifications and variations. The modified examples will be described hereinafter.

Modified Example 1

In the embodiment stated above, the storage unit 22 is configured to be readable/writable by either of the entire control processor 20 and the video-output system processor 25 as a single storage unit. However, the storage unit (non-volatile memory) may be configured to be a plurality of storage units (for example, two) (not shown). One of the storage units may be connected to the entire control processor 20 and the other may be connected to the video-output system processor 25. In this case, the parameters used for the video-output system processor 25 (including the ON/OFF setting information of initial image display when activated, the information on installment state, the information on trapezoidal distortion correction value, the information on lighting numbers of the laser light source, the light source type for the driving target, the current value information when the light source is lighted and the light source balance adjustment value) are stored in both of two storage units. When the parameters are changed by the image menu, the changed values are firstly stored in the storage unit connected to the entire control processor 20. The entire control processor 20 notifies the video-output system processor 25 of a change in the parameters. The video-output system processor 25 may update the parameters in the storage unit connected to it based on the received notification. Therefore, it is possible to synchronize each of the parameters stored in two storage units.

Modified Example 2

In the embodiment stated above, the frame memory 23 is connected to the entire control processor 20, and the frame memory 26 is connected to the video-output system processor 25. However, instead of the frame memories 23 and 26, one frame memory (not shown) shared by the entire control processor 20 and the video-output system processor 25 may be provided.

Modified Example 3

In the embodiment stated above, the entire control processor 20 detects, as predetermined decisions, whether or not the fan functions normally, whether or not the motor for the aperture functions normally and the aperture is fully opened, whether or not the motor for the lens shutter functions normally and the lens shutter is fully opened, and whether or not the sensor for measuring illuminance values of the light source devices 30 and 710 is correctly worked. However, the video-output system processor 25 may detect and determine if there is any detection performable by the video-output system processor 25 among the predetermined decisions.

Modified Example 4

In the embodiment stated above, when the power source is turned ON (when the power source key is pushed down), the entire control processor 20 reset-releases the video-output system processor 25. However, the video-output system processor 25 may not need to be reset-released by the entire control processor 20. The video-output system processor 25 may be reset-released before the power source is turned ON. The video-output system processor 25 may light the light sources after receiving the instruction to light the light source devices from the entire control processor 20 even in this case. Thus it is possible to avoid lighting the light sources at an undesired timing or with undesired parameters.

Modified Example 5

In the embodiment stated above, the first light source device 30 for emitting the red light and the green light and the second light source device 710 for emitting the blue light are provided. However, the configuration of the light source device is not limited thereto. For example, a single light source device (not shown) which emits the laser beam as the blue light may be used to allow the blue light from the light source device to enter the rotational fluorescent plate (not shown). The fluorescent layer (not shown) provided on the rotational fluorescent plate may be configured to convert part of the blue light from the light source device into the light including the red light and the green light, and to cause a remaining part of the blue light to pass through without conversion.

Modified Example 5

In the embodiment stated above, the light source devices 30 and 710 are the laser light sources. However, another other solid light source such as an LED light source may be used, or yet another light source such as a discharge light source lamp may also be used.

Modified Example 6

In the embodiment stated above, the projector 1 has the transmissive liquid-crystal light modulation devices 400R, 400G and 400B as the light modulator. However, the reflection type light modulator such as the reflection type liquid-crystal light modulation device may be employed. Furthermore, the micromirror array device, which modulates the light emitted from the light source by controlling the emitting direction of the incident light for each micromirror as the pixel, may be used as the light modulator.

What is claimed is:

1. A projector comprising:
   a light source;
   a first CPU that controls the projector;
   a second CPU that controls the light source; and
   a storage unit that stores parameters for the second CPU to control the light source,
   wherein the second CPU starts to control the light source based on the parameters stored in the storage unit when the second CPU is activated, such that the second CPU starts to control the light source before activation of the first CPU is completed,
   when the parameters are changed, the first CPU stores the changed parameters in the storage unit, and
   the second CPU activates in accordance with an activation command from the first CPU, such that
      the second CPU starts to control the light source without another command from the first CPU after activated in accordance with the activation command from the first CPU, and
      immediately upon activation of the second CPU, the second CPU controls the light source based only on the parameters stored in the storage unit prior to receiving any signal from the first CPU after the activation command.

2. The projector according to claim 1, further comprising:
   a menu display unit that displays a menu image for setting the projector; and
   an operation receiving unit that receives operations performed in the menu image,
   wherein when the parameters are changed in accordance with the operation received in the menu image by the receiving unit, the first CPU stores the changed parameters in the storage unit.

3. The projector according to claim 1, wherein
   the first CPU stores predetermined parameters related to the second CPU in the storage unit when the projector is operated to be turned OFF.

4. The projector according to claim 1, wherein
   the second CPU notifies the first CPU when the light source is prepared to be lighted, and
   the first CPU performs a predetermined decision process when receiving the notification, and instructs the second CPU to light the light source if a result of the predetermined decision process is normal.

5. The projector according to claim 4, wherein
   the predetermined decision process performed by the first CPU is a decision process for deciding whether a cooling mechanism of the projector functions normally or not.

6. The projector according to claim 4, wherein
   the predetermined decision process performed by the first CPU is a decision process for deciding whether a sensor for measuring an illuminance of the light source is normally worked or not.

7. A method for controlling a projector which includes: a first CPU that controls the projector; a second CPU that controls a light source; and a storage unit that stores parameters for the second CPU to control the light source, the method comprising:
   allowing the second CPU to activate in accordance with an activation command from the first CPU and allowing the second CPU to start to control the light source based on the parameters stored in the storage unit when the second CPU is activated, such that the second CPU starts to control the light source before activation of the first CPU is completed; and
   allowing the first CPU to store, when the parameters are changed, the changed parameters in the storage unit, wherein
   the second CPU starts to control the light source without another command from the first CPU after activated in accordance with the activation command from the first CPU, and
   immediately upon activation of the second CPU, the second CPU controls the light source based only on the parameters stored in the storage unit prior to receiving any signal from the first CPU after the activation command.

* * * * *